3,356,862
HIGH SPEED CONTROLLED RECTIFIER
Edward J. Diebold, Palos Verdes Estates, and Yigal Yanai, Hollywood, Calif., assignors to International Rectifier Corporation, El Segundo, Calif., a corporation of California
Filed Dec. 2, 1964, Ser. No. 415,292
5 Claims. (Cl. 307—88.5)

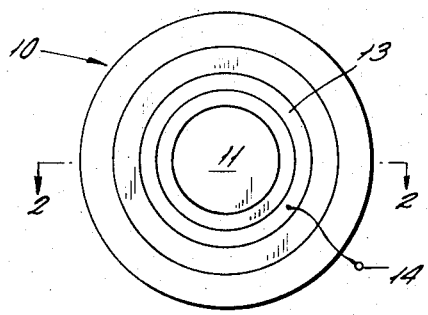
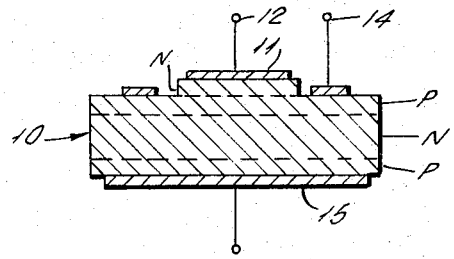
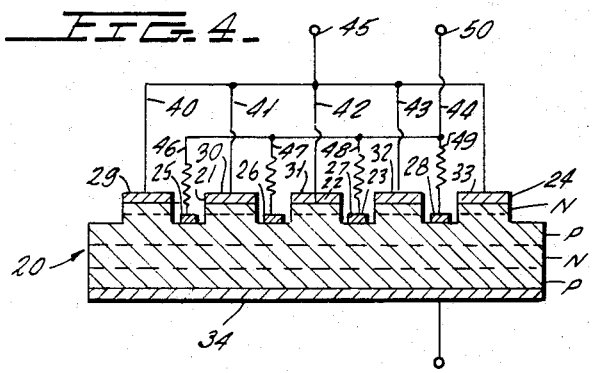
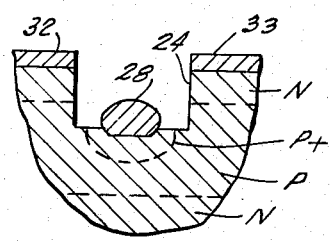
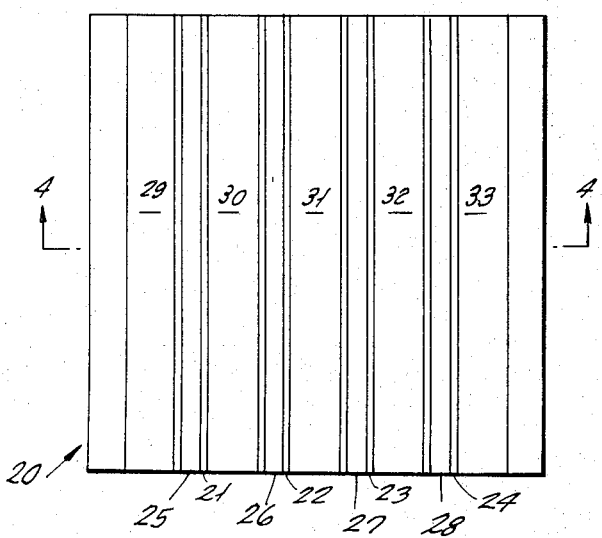
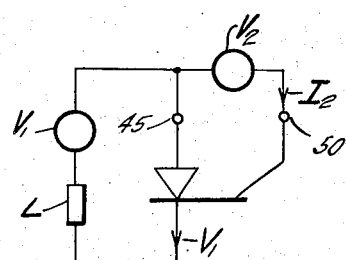

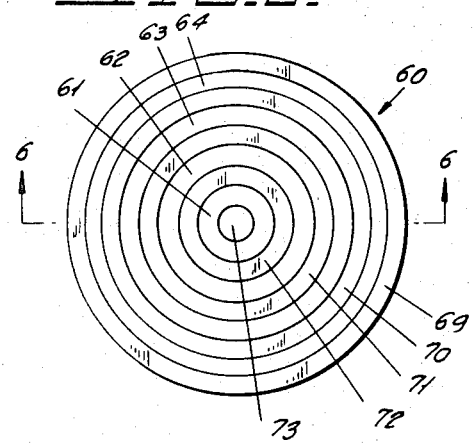
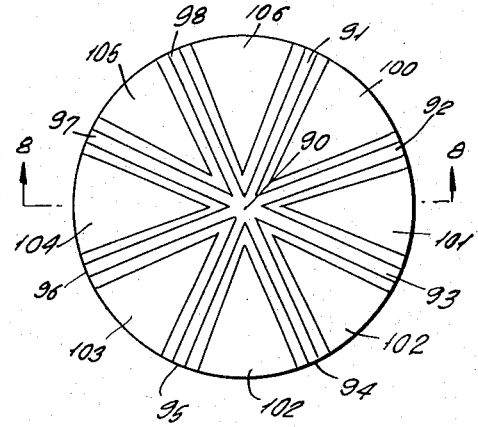
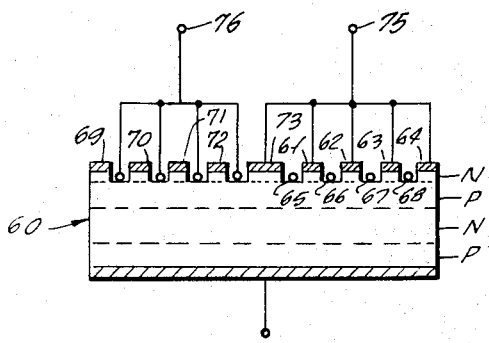
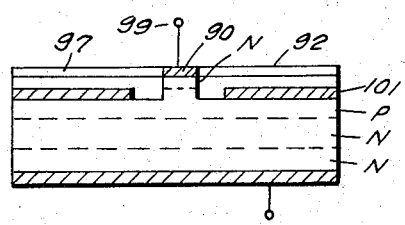
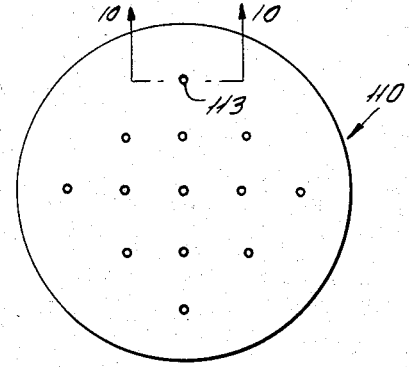
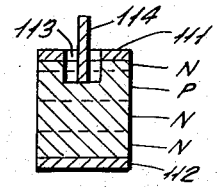

This invention relates to controlled rectifiers, and more particularly relates to a novel controlled rectifier having a very short complete turn-on time.

Presently used controlled rectifiers have a limit on their upper frequency which is primarily determined by the complete turn-on time of the unit. More specifically, the turn-on time of a controlled rectifier or the time required to change its condition from nonconducting to conducting is extremely short, and may be of the order of 1 microsecond. However, the device is not fully conductive at this time so that it is necessary to apply circuit control means to prevent the full application of power to the device until it has been completely turned on, which may take of the order of 5 to 10 microseconds. That is to say, after a controlled rectifier becomes conductive, it will still have a substantial forward voltage drop which continually decreases. If the current through the device is permitted to increase while this decreasing forward voltage drop is still relatively high, the power required to be dissipated by the controlled rectifier will exceed the capability of the device and thus damage or destroy the device, or prevent its proper operation. It is, therefore, necessary to wait an additional 5 to 10 microseconds so that the voltage drop across the unit can decay to an order of 1% of its initial blocking voltage, or less.

For example, a controlled rectifier can be turned on within one microsecond, after which time its forward blocking voltage decreases by 50% and the forward current has increased to 50% of its normal value. If it is necessary to wait 10 microseconds for the forward blocking voltage to decrease to 1% of its normal value (to be turned fully on) the heat dissipation will be approximately double the noted value of the controlled rectifier. If the current rise time to rated value is reduced to 5 microseconds, the heat dissipation is 5 times as much, and if it is reduced to 4 microseconds, the heat dissipation will be approximately 10 times what is normally achieved. If the reduction is further made to 2 microseconds, then the device will be required to dissipate approximately 100 times as much heat as it is designed for.

One reason for the time delay between initial conduction of a controlled rectifier and its complete conduction is that the initial conduction begins with current carriers which flow from the point at which the gate is connected to the remainder of the wafer. This relatively confined plasma can cause initial conduction very rapidly since it need expand only for a short distance across the width of the wafer to initiate conduction. This width could be of the order of 5 mils.

However, for full conduction, the plasma must expand over the full breadth of the wafer which could be of the order of ¼ inch. Moreover, there are no accelerating fields across the breadth of the wafer so that the expansion velocity of the plasma is relatively small.

The principle of the present invention is to provide a novel construction for four-layer semiconductor devices in which the initial conducting plasma is created at many different points over the breadth of the wafer. Thus, in accordance with one embodiment of the invention, a plurality of individual spaced gate electrodes are provided whereby a plurality of initial conducting points are established through the device with the subsequent expansion of the plasma over the breadth of the wafer being accomplished in a shorter time than previously required It is to be noted that the prior art illustrates many examples of three-layer type devices such as transistors which are provided with a plurality of diverse and parallel connected electrodes. By way of example, it has been common practice in the transistor art to provide an interleaving arrangement of base and emitter contacts. This, however, is done solely to increase the current capacity of the device, and is wholly unrelated to the switching time of the devices.

A similar interleaving arrangement could be provided in accordance with the invention between a plurality of gate and cathode electrodes in a four-layer device (as contrasted to a three-layer device) with the wholly unexpected result being obtained of decreasing turn-on time.

The creation of a major plasma at one time, in accordance with the invention, requires a large gate area which is intimately associated with the cathode area of the controlled rectifier. Moreover, it has been found that a relatively large gate signal is also required. The application of a suitable gate signal in combination with the novel increased gate area of the invention is of considerable importance. That is to say, if the gate areas and cathode areas have suitable geometry, but an insufficient current-carrying capacity is available from the gate circuit, then only a few plasma spots will be created along the cathode rim which must then expand both axially along the gate strip itself and laterally into the cathode.

More specifically, and in accordance with the invention, a gate-to-cathode current must be available from the cathode circuit which is equal to or larger than the ultimate current to be carried by the cathode. On the other hand, this current should be of extremely short duration and applied at very low voltage, whereas the ultimate current through the cathode, of course, occurs at high voltage for a normal duration period.

With the present device, it will be seen that amplification now becomes a voltage amplification (with far smaller power losses during conduction than in a transistor-type device) with the device remaining conductive after the gate signal is applied so that the gate signal is required only for a very short time. Note, however, that the normal high current gain of a controlled rectifier is sacrificed somewhat with the present invention for the sake of increased speed of response.

When turning off the device of the present invention, the ionized plasma between cathode and anode must be swept out very rapidly without depending upon the normal recombination of ions in the four-layer zones. Thus, with the device of the invention, high speed turn-off is achieved by drawing a large negative current out of the gate areas when the controlled rectifier is subjected to a negative voltage at the anode. The combination of the negative gate current and the negative anode voltage will then de-ionize the controlled rectifier extremely rapidly requiring only a short travel of ions across the narrow cathode width to the gate with extremely efficient removal of carriers through the long and broad strips forming the gate electrodes.

Accordingly, a large amount of turn-off current in the gate will also be required which somewhat reduces the gain of the controlled rectifier of the invention; again, however, for the sake of a substantially increased speed of response of the device.

Accordingly, a primary object of this invention is to increase the speed of response of a controlled rectifier.

Another object of this invention is to substantially decrease the complete turn-on time of a controlled rectifier.

Another object of this invention is to provide a controlled rectifier which is useful in higher frequency applications than are presently possible for controlled rectifiers.

These and other objects of this invention will become apparent from the following description when taken in connection with the drawings, in which:

FIGURE 1 is a top plan view of a prior art type of controlled rectifier.

FIGURE 2 is a cross-sectional view of FIGURE 1 taken across the lines 2—2 in FIGURE 1.

FIGURE 3 is a top view of a controlled rectifier constructed in accordance with the present invention.

FIGURE 4 is a cross-sectional view of FIGURE 3 taken across the lines 4—4 in FIGURE 3.

FIGURE 4a is a fragmental view of FIGURE 4 particularly illustrating the connection of a gate electrode in a groove of the wafer.

FIGURE 4b shows a circuit diagram employing the device of the invention.

FIGURE 5 is a top plan view of a second embodiment of the invention.

FIGURE 6 is a cross-sectional view of FIGURE 5 taken across the lines 6—6 in FIGURE 5.

FIGURE 7 is a top view of a further embodiment of the invention.

FIGURE 8 is a cross-sectional view of FIGURE 7 taken across the lines 8—8 in FIGURE 7.

FIGURE 9 is a top view of a further embodiment of the invention.

FIGURE 10 is a cross-sectional view of one of the openings in FIGURE 9, and taken across the lines 10—10 in FIGURE 9.

Referring first to FIGURES 1 and 2, we have illustrated therein a typical prior art controlled rectifier comprised of a wafer 10 which could be of silicon, and as shown in FIGURE 2, has four layers of different conductivity types such as the sequence of NPNP thus defining three junctions in the device.

The upper N-type region of wafer 10 then has a suitable electrode 11 connected thereto which is connected to a cathode terminal 12. A gate electrode ring 13 is then connected to the P-type region below the upper N-type region, and is connected to a gate terminal 14. As shown in FIGURE 2, an anode electrode 15 is then connected to the lower P-type region of wafer 10.

As indicated above, in order to turn on the prior art device of FIGURES 1 and 2, a single initial plasma is quickly initiated between electrodes 11 and 15 responsive to the injection of carriers from gate electrode 13. Note that the dimensions of the figures are exaggerated so that the thickness of the entire wafer may be of the order of 5 to 10 mils whereby the expansion of this initial plasma can be accomplished very rapidly, particularly in view of the accelerating electric field appearing between electrodes 11 and 15. However, in order to obtain full current conduction, it is necessary for this plasma to expand transversely across the full width of the wafer. This requires considerable time since the full width of the wafer could have a diameter of a quarter of an inch.

Therefore, while conduction is initiated in the order of 1 microsecond, it is necessary to delay the full application of power current to the device for 5 to 10 microseconds and until the plasma is established across the full width of the wafer.

In accordance with the present invention, a plurality of separate gate-to-cathode regions are established whereupon a plurality of initial conducting plasma points are created thereby substantially decreasing the time required for the spread of plasma across the full width of the wafer.

By way of example, and as illustrated in FIGURES 3, 4 and 4a, a silicon wafer 20 is prepared which has NPNP regions, as illustrated, and in the standard manner.

In accordance with the invention, however, a plurality of cooperating gate and cathode electrodes are provided. Thus, as shown in FIGURE 4, a plurality of grooves 21, 22, 23 and 24 are made in the upper surface of the wafer which extend below the first junction adjacent the top of the wafer. Thereafter, and as shown in FIGURE 4a, thin aluminum strips such as strips 25, 26, 27 and 28 are placed in the bottom of the grooves 21 through 24, respectively, and are alloyed into the grooves, thus defining a P+ region (FIGURE 4a) and connecting the electrode strips 25 through 28 to the wafer. Thereafter, these grooves are suitable masked, and conductive electrodes 29, 30, 31, 32 and 33 are placed on the upper N-type surface regions of the wafer, while an electrode 34 is connected to the bottom of the wafer. The electrodes 29 through 33 serve as cathode electrodes, while electrode 34 serves as the anode electrode of the device.

Clearly, any desired technique could be used to form the device shown in FIGURES 3, 4 and 4a. By way of example, the wafer can be initially prepared with its alternate NPNP conductivity regions, and electrodes can then be placed over the full opposing surfaces of the device. Thereafter, the grooves 21 through 24 can be etched directly into the upper surface of the device and through its previously deposited electrode with the lower strips serving as gate electrodes 25 through 28 thereafter being connected in place.

Whichever technique is selected from those techniques available to those skilled in the art, the completed device will have a plurality of alternate gate and cathode regions. Thus, in FIGURES 3 and 4, gate electrode 25 cooperates with cathode electrodes 29 and 30. Similarly, the remaining gate electrodes cooperate with two adjacent cathode electrodes.

Each of the electrodes are then connected to a suitable lead conductor such as lead conductors 40, 41, 42, 43 and 44 which are connected to cathode electrodes 29 through 33, respectively. These lead conductors are all then connected to a common terminal 45 which serves as the gate terminal of the completed device.

Lead conductors 46, 47, 48 and 49 are then connected to strips 25 through 28, respectively, and again are all connected to the common terminal 50 which serves as the gate terminal of the device. Note that the lead conductors 46 through 48 may have resistors therein to serve to balance gate current by providing a resistance substantially greater than the normal gate-to-cathode resistance.

In operation of the device of FIGURES 3 and 4, suitable circuit means will be provided between terminals 45 and 50 which will provide a firing current for an extremely short time whose magnitude is equal to or greater than the magnitude of normal current flow between electrodes 34 and 45. Thus, as shown schematically in FIGURE 4b, a suitable source $V_1$ is connected in series with the cathode and anode terminals and a load L. A firing source $V_2$ is then available which is capable of providing a short current pulse $I_2$ which has a magnitude greater than the full rated value of current $I_1$. The application of this short current pulse will then create a plurality of individual plasma spots between gate electrodes 25 through 28 and their respective cathodes whereby the spread of plasma over the full transverse surface area of the wafer occurs in a time substantially shorter than the time required for an arrangement of the type shown in FIGURES 1 and 2.

The embodiment of FIGURES 3, 4 and 4a illustrates only one method by which applicant's novel results are accomplished. Other structures are available for accomplishing the same purpose, as illustrated in FIGURES 5 through 10. In FIGURES 5 and 6, a circular wafer 60 is provided having the alternate NPNP arrangement and which is provided with annular grooves 61, 62, 63 and 64. Each of annular grooves 61, 62, 63 and 64 then receive circular gate electrode rings 65, 66, 67 and 68, respectively (FIGURE 6), while the raised surface areas of the wafer receive upper conductive rings 69, 70, 71, 72 and 73 which form the cathode electrodes. Each of the cathode electrodes are then provided with suitable leads connected to a common cathode terminal 75, while each of the gate conductors 65 through 68 are connected to a common terminal 76.

Clearly, the device of FIGURES 5 and 6 will accomplish the same end results as described previously.

A further embodiment of the invention is shown in FIGURES 7 and 8 wherein the cathode electrode is comprised of a central conductive hub 90 having outwardly radiating spokes 91 through 98. The central hub 90 may then be connected to a suitable terminal 99, as shown in FIGURE 8.

The surface material between the spokes 91 through 98 is then removed below the first junction at the top of the wafer, as shown in FIGURE 8, and this surface region receives segmentally shaped gate electrodes 100 through 106. Each of the segments 100 through 106 then has suitable lead conductors extending therefrom (not shown) which are connected to a common gate terminal. Clearly, the device formed in the manner shown in FIGURES 6 and 7 will perform in a manner similar to that previously described for the device of FIGURES 3 through 6.

A still further embodiment of the invention is shown in FIGURES 9 and 10 wherein a wafer 110 formed of four layers in the usual manner has upper and lower conductive electrodes 111 and 112, respectively, formed over its full upper and lower surface areas. Thereafter, a plurality of openings such as opening 113 are formed in the top surface of the device extending below the first junction of the device, as illustrated in FIGURE 10.

A suitable conductive lead such as lead 114 is then connected to the base of opening 113 with other similar leads being connected to the bases of their respective openings, these leads defining the gate leads of the device. Thereafter, these individual gate leads are connected together to define a plurality of points of plasma initiation for rapid firing of the device in accordance with the invention.

Although this invention has been described with respect to its preferred embodiments, it should be understood that many variations and modifications will now be obvious to those skilled in the art, and it is preferred, therefore, that the scope of the invention be limited not by the specific disclosure herein, but only by the appended claims.

The embodiments of the invention in which an exclusive privilege or property is claimed are defined as follows:

1. In combination: a high speed controlled rectifier and an electrical circuit for said high speed controlled rectifier; said high speed controlled rectifier comprising a wafer of semiconductor material having four layers of alternate conductivity types defining three series arranged junctions; a plurality of gate electrodes connected to the second of said layers; a plurality of cathode electrodes connected to the first of said layers, and an anode electrode connected to the last of said layers; said plurality of gate electrodes being laterally disposed in close, spaced relation to respective cathode electrodes of said plurality of cathode electrodes whereby a plurality of initial conducting plasmas are simultaneously produced in said wafer responsive to the injection of carriers from said gate electrodes; said electrical circuit comprising a first and second voltage source and a load; said first voltage source, said load, said plurality of cathode electrodes and said anode electrode being connected in series; said second voltage source, said plurality of gate electrodes and said plurality of cathode electrodes being connected in series; said second voltage source comprising a source of pulse current having a short duration; the magnitude of said pulse current greater than the magnitude of the current flowing from said first voltage source and through said anode electrode when said controlled rectifier is fully conductive.

2. The device substantially as set forth in claim 1 wherein said plurality of gate electrodes and said plurality of cathode electrodes lie along parallel straight lines.

3. The device substantially as set forth in claim 1 wherein said plurality of gate electrodes and said plurality of cathode electrodes are arranged in concentric rings.

4. The device substantially as set forth in claim 1 wherein one of said plurality of gate electrodes or said plurality of cathode electrodes are defined by extending segments radially extending from the center of said wafer; the other of said plurality of gate electrodes or cathode electrodes being respectively positioned between said radially extending segments.

5. A high speed controlled rectifier comprising a wafer of semiconductor material having four layers of alternate conductivity types defining three series arranged junctions; a cathode electrode connected to the first of said layers; a plurality of gate electrodes connected to the second of said layers; and an anode electrode connected to the last of said layers; said plurality of gate electrodes being laterally disposed in close, spaced relation whereby a plurality of initial conducting plasmas are simultaneously produced in said wafer responsive to the injection of carriers from said gate electrodes; each of said plurality of gate electrodes comprising a spaced, small area contact extending through and spaced from both said first layer and said cathode electrode into said second layer.

References Cited

UNITED STATES PATENTS

| | | | |
|---|---|---|---|
| 3,025,438 | 3/1962 | Wegener | 317—235 |
| 3,097,335 | 7/1963 | Schmidt | 321—45 |
| 3,210,563 | 10/1965 | New | 317—235 |
| 3,210,621 | 10/1965 | Strull | 317—235 |
| 3,213,339 | 10/1965 | Henkels | 317—235 |

FOREIGN PATENTS

| | | |
|---|---|---|
| 869,680 | 7/1961 | Great Britain. |

JOHN W. HUCKERT, *Primary Examiner.*

L. ZALMAN, J. SHEWMAKER, *Assistant Examiners.*